United States Patent
Yin et al.

(10) Patent No.: US 6,996,717 B2
(45) Date of Patent: Feb. 7, 2006

(54) SEMI-FRAGILE WATERMARKING SYSTEM FOR MPEG VIDEO AUTHENTICATION

(75) Inventors: Peng Yin, Princeton, NJ (US); Hong Heather Yu, Plainsboro, NJ (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 892 days.

(21) Appl. No.: 09/865,158

(22) Filed: May 24, 2001

(65) Prior Publication Data

US 2002/0178368 A1    Nov. 28, 2002

(51) Int. Cl.
*G06F 17/00* (2006.01)
(52) U.S. Cl. .................. 713/176; 713/168; 713/179
(58) Field of Classification Search .......... 713/186, 713/168–171, 150, 176–179, 180; 382/100
See application file for complete search history.

(56) References Cited

U.S. PATENT DOCUMENTS

| | | | | |
|---|---|---|---|---|
| 5,991,426 | A * | 11/1999 | Cox et al. ............... | 382/100 |
| 6,373,960 | B1 * | 4/2002 | Conover et al. ......... | 382/100 |
| 2002/0012445 | A1 * | 1/2002 | Perry .................... | 382/100 |
| 2002/0031240 | A1 * | 3/2002 | Levy et al. ............. | 382/100 |

OTHER PUBLICATIONS

"Watermarking MPEG Video", 1998, [Retrieved from Internet Oct. 29, 2004], "http://hoffy.hoffyland.com/watermark/final.html".*
Bruce Schneier, 1996, John Wiley & Sons, Inc., "Applied Cryptography", 38.*
Watermark design pattern for intellectual property protection in electronic commerce applications Kwok, S.H.; Yang, C.C.; Tam, K.Y.; System Sciences, 2000. Proceedings of the 33rd Annual Hawaii International Conference on Jan. 4-7, 2000 Page(s):10 pp. vol. 2.*
A novel fragile watermarking technique Shih, F.Y.; Yi-Ta Wu; Multimedia and Expo, 2004. ICME '04. 2004 IEEE International Conference on vol. 2, Jun. 27-30, 2004 Page(s):875-878 vol. 2.*
Fragile watermark based on the Gaussian mixture model in the wavelet domain for image authentication Yuan, H.; Zhang, x.-P.; Image Processing, 2003. Proceedings. 2003 International Conference on vol. 1, Sep. 14-17, 2003 Page(s):I-505-8 vol. 1.*
Coppersmith, Don, et al.; "Fragile Imperceptible Digital Watermark With Privacy Control"; Part of the IS&T/SPIE Conference on Security and Watermarking of Multimedia Contents; San Jose, California; Jan. 1999; SPIE vol. 3657; pp. 79-84.

(Continued)

*Primary Examiner*—David Jung
(74) *Attorney, Agent, or Firm*—Harness, Dickey & Pierce, PLC

(57) ABSTRACT

The semi-fragile watermark comprises a fragile watermark component and a robust watermark component. Features are extracted from the video stream and subsequent hashing and encryption processes are performed to generate the fragile watermark. The fragile watermark includes control data information at the block level as well as frame and group level information. The fragile watermark is added on top of the robust watermark, giving the system the ability to detect alteration at the block level as well as the group level. The resulting semi-fragile watermark has the advantage of being both sensitive to malicious attack while being robust enough to survive bit rate reduction and other types of manipulation typically performed on digital multimedia signals.

18 Claims, 2 Drawing Sheets

OTHER PUBLICATIONS

Holliman, Matthew et al.; "Counterfeiting Attacks on Oblivious Block-wise Independent Invisible Watermarking Schemes"; IEEE Transactions on Image Processing; vol. 9, No. 3; Mar. 2000; pp. 432-441.

Dittmann, Jana et al.; Media-independent Watermarking Classification and the Need for Combining Digital Video and Audio Watermarking for Media Authentication; IEEE; 2000; pp. 62-67.

Hartung, Frank et al.; "Multimedia Watermarking Techniques"; Proceedings of the IEEE; vol. 87, No. 7; Jul. 1999; pp. 1079-1107.

Lin, Ching-Yung et al.; "Issues and Solutions for Authenticating MPEG Video"; Dept. of Electrical Engineering & New Media Technology Center, Columbia University, New York, New York; pp. 1-12.

Fridrich, Jiri; A Hybrid Watermark for Tamper Detection in Digital Images; Fifth International Symposium on Signal Processing and its Applications; ISSPA; Brisbane, Australia; Aug. 22-25, 1999; pp. 301-304.

Podilchuk, Christine I. et al.; "Image-Adaptive Watermarking Using Visual Models"; IEEE Journal on Selected Areas in Communications; vol. 16, No. 4; May 1998; pp. 525-539.

Wu, Min et al.; "Multi-level Data Hiding for Digital Image and Video"; Electrical Engineering Dept. Princeton Univ., Princeton, NJ; Panasonic Information & Networking Technologies Laboratory, Princeton, NJ; entire document.

* cited by examiner

SEMI-FRAGILE WATERMARKING SYSTEM FOR MPEG VIDEO AUTHENTICATION

BACKGROUND AND SUMMARY OF THE INVENTION

The present invention relates generally to digital watermarking for digital multimedia. More particularly, the invention relates to a watermarking system useful for authentication, error concealment and other multimedia watermarking applications.

Because of the potential to make perfect digital copies from digitally distributed media, content providers have requested equipment manufactures to develop copy protection technologies that are robust and resistant to attack, without being unduly cumbersome for the legitimate end user. Many copy protection schemes in use today rely upon encryption and authentication. Under a typical scheme the data is encrypted and protected by an authentication mechanism that will allow the data to be decrypted for playback. The encrypted media (e.g., DVD disc) is provided with a digital key that is stored somewhere on the media, such as in the lead-in area preceding the digital content. The playback drive unit reads this key and generates the necessary decryption key to allow the content to be decrypted and played back.

To prevent or at least control the creation of perfect digital copies, component manufactures place a digital copy protection system in the devices at the time of manufacture. Thereafter, when two components are connected together, such as a DVD player and a digital TV or digital VCR, the copy protection systems exchange keys and authentication certificates to establish a secure channel. The DVD player encrypts the audio and video signal as it sends it to the receiving device, which must decrypt it. This keeps other connected but unauthenticated devices from stealing the signal. Similar techniques may be used in other digital medial applications, including cable delivery systems, satellite delivery systems, and alike.

In digital authentication systems, such as the ones discussed above, determining how to deploy the authentication certificate in the media can be quite challenging. The conventional approach is to treat each frame of digital content (e.g. each MPEG frame) as an independent image and add the authentication watermark in the spatial domain. This entails the writing of a digital watermark at a predetermined spatial location in each frame. An alternate approach is to add the authentication information in a separate header associated with the media content. Both of these conventional solutions have problems. First, placing the authentication information in a predetermined spatial location or in a predetermined header exposes the authentication information to possible discovery and misappropriation. Simply stated, if the authentication information can be extracted intact, it can be used again to spoof the system into allowing unauthorized copies to be made.

Second, the authentication information that is spatially disposed or placed in a header can become corrupted by compression-decompression operations that may be preformed on the data as part of the regular distribution process. For example, digital content may be converted to a lower bit rate, allowing it to pass through a lower band with channel, and this can have an adverse effect upon the integrity of the authentication information. If the authentication information is damaged during the normal process of distribution, even legitimate users will be prevented from accessing the digital content.

One of the interesting challenges with digital content authentication is that the authentication information should be fragile when under attack and yet robust under normal delivery conditions. Thus the well designed authentication system should behave in a fragile way under attack, so that the authentication information is destroyed thereby preventing the attacker from using it. Conversely, the authentication information should be robust enough not to loose its integrity when normal delivery processes are preformed upon it. Transcoding operations to effect bit rate reduction should not damage the robust authentication information. Achieving these seemingly opposite goals has heretofore proven elusive.

The present invention provides a semi-fragile watermarking system that may be used for authentication of digital content. Although the techniques of the invention can be applied in a variety of different digital media applications, the watermarking system finds particular utility in the MPEG video application and it will therefore be described in that context here. The semi-fragile watermarking system employs a dual component watermark, including a fragile watermark and a robust watermark. The two watermark components are extracted from features derived from the digital content, allowing the watermarks to be placed beyond the spatial domain where they are far more difficult to discover and tamper with. The fragile watermark is encrypted hash of quantized DCT coefficient. The fragile watermark is embedded by an odd-even approach. The robust watermark may also be derived from the hash value. In the presently preferred embodiment the robust watermark is embedded using a block-based spread spectrum approach. The robust watermark is embedded using a noise-like random signal that is modulated with the authentication data. Watermark strength is adjusted by monitoring the Just Noticeable Difference (JND) parameter of the MPEG format.

The result is a semi-fragile watermark that has both fragile and robust components. In the preferred architecture the fragile watermark is added on top of the robust watermark. Because the embedding capacity of the two watermarks is different, the fragile watermark will reveal alteration at the video block level, while the robust watermark maybe accessed at the higher group level.

The semi-fragile watermarking system of the invention improves the encoding and decoding speed when compared to conventional watermarking methods. Because no additional bits are needed to carry the authentication information, the effective bit rate using the invention is better than with conventional authentication techniques. If transcoders are used to reduce the bit rate, to accommodate a low bandwidth channel, the watermark remains robust. As will be more fully explained herein, the watermarking system can differentiate among various attacks, allowing those attacks to be combated using the most effective techniques appropriate for the type of attack. For a more complete understanding of the invention, its objects and advantages, refer to the remaining specification and to the accompanying drawings.

DESCRIPTION OF THE PREFERRED EMBODIMENTS

The semi-fragile watermarking system of the invention can be used in a variety of different applications. Because it finds particular utility in digital video applications, the invention will be described in the context of a MPEG environment. An exemplary MPEG environment is illustrated in FIG. 1.

Figure 1:
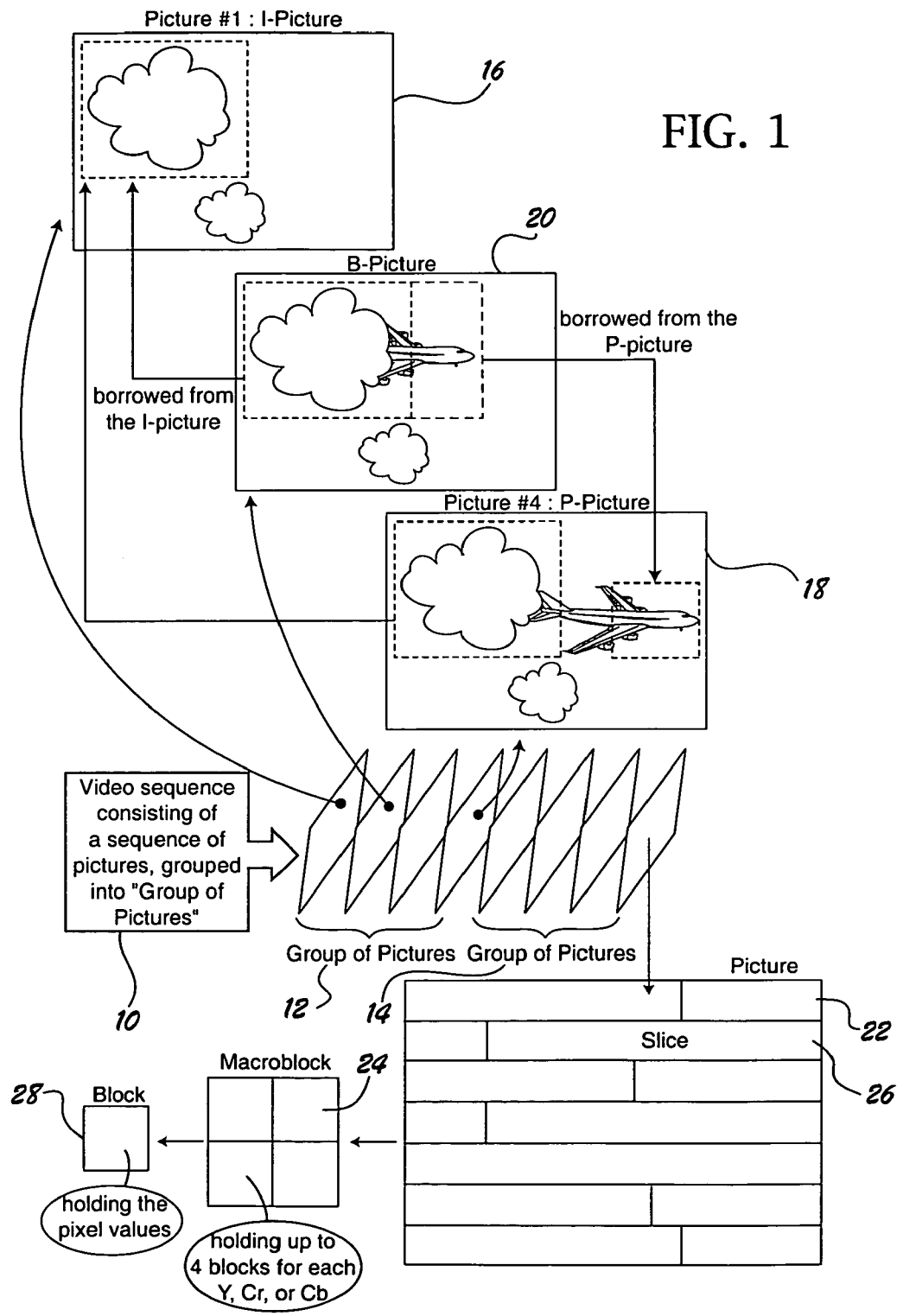
FIG. 1 is a block diagram illustrating the MPEG environment in which the fragile watermarking system of the invention may be employed.

Referring to FIG. 1, the MPEG video standard defines a format that is used to describe a coded video bit stream. The bit stream can be delivered across any suitable distribution medium. Video information, including both picture and audio information is encoded and compressed prior to storage and/or transmission. The encoded bit stream is then decompressed and decoded at the playback site. A typical video sequence consists of a sequence of pictures, as illustrated at 10, which are in turn grouped into units called a Group Of Pictures (GOP). In FIG. 1 two such GOP groups are illustrated at 12 and 14.

The MPEG standard defines different coding formats for different types of pictures, based on the function those pictures will need to perform when producing the decoded output. The MPEG-2 standard defines intra-coded pictures (I-pictures) as pictures that are coded in such a way that they can be decoded without knowing anything about other pictures in the video sequence. An exemplary I-pictures is illustrated at 16 in FIG. 1. The I-picture is normally provided as the first picture in a video sequence, because it can provide bootstrap information for the pictures that follow.

The MPEG-2 standard also defines Predictive coding pictures (P-pictures) as illustrated at 18. Predictive coded pictures are decoded by using information from another picture which was displayed earlier. The previous picture is called the reference picture, and it can be coded as a I-picture or a P-picture. The information used from the previous picture is determined by motion estimation and is coded into what are called inter-macroblocks.

The MPEG-2 standard also defines a third type of picture known as Bidirectionally coded pictures (B-pictures). An example of a B-picture is illustrated at 20 in FIG. 1. Bidirectionally coded pictures also use information from other pictures. Like P-pictures, they can use information provided by pictures that occurred before. Additionally, B-pictures can also use information from a picture coming in the future.

Each picture, regardless of its picture type, is encoded according to a predefined picture format illustrated at 22 in FIG. 1. The picture comprises a plurality of macroblocks 24 which are grouped into slices 26. Each macroblock holds up to 4 blocks, such as block 28. The blocks hold the basic luminosity and color information that determine how the individual pixels of the displayed image will be portrayed. Under the MPEG-2 standard the color component values are represented by numeric values for Y, Cr, Cb.

In an MPEG video application, the presently preferred embodiment of the invention places the semi-fragile watermark in the compressed domain, as opposed to the spatial domain used by conventional watermarking systems. The Group of Pictures (GOP) serves as the unit for embedding. The semi-fragile watermark is integrated with the host media so that it is not necessary to decompress the video signal in order to examine the authentication information contained in the watermark.

This aspect makes the watermark of the invention particularly useful with media, such a DVD discs, that are localized to work only with disc players of a given geographic region. The watermark of the invention is accessible to the player even if the region code does not match that of the player.

The semi-fragile watermark is integrated directly into the existing video content. Thus no additional bits need to be added in order to carry the authentication information. This differs from conventional systems which add authentication information as extra bits that must then be processed during playback. Because no additional bits are needed, the bit rate is not degraded when using the invention. It is also possible to perform watermarking authentication in real time when using the invention, because there is no need to decompress the video signal in order to ascertain the authentication value as with conventional systems.

The invention employs a semi-fragile watermark comprising two parts: a fragile watermark component and a robust watermark component. These two components are derived in different ways and are embedded in the media in different domains as will be more fully explained below. The procedure for generating the respective fragile and robust watermark components is illustrated in FIG. 2.

Figure 2:
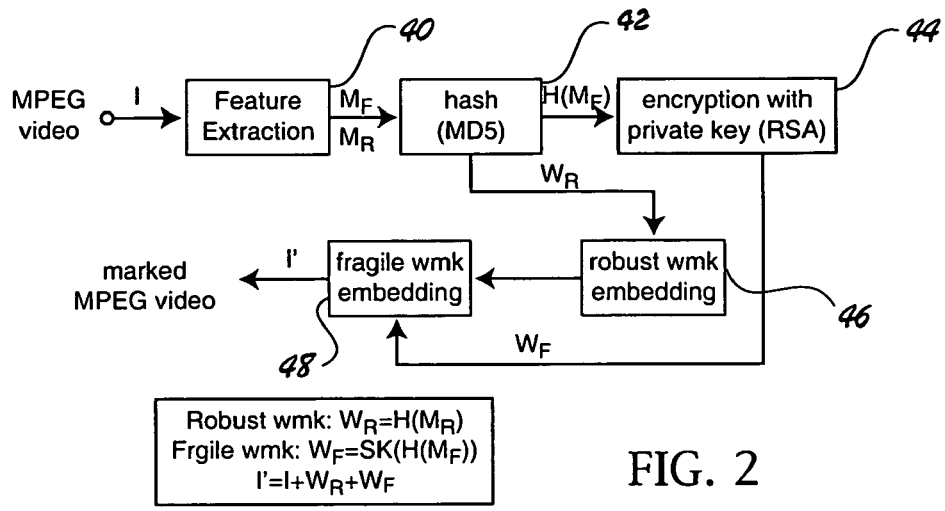
FIG. 2 is a block diagram illustrating the semi-fragile watermark embedding scheme.

Referring to FIG. 2, the input digital signal, in this case an MPEG video signal, is supplied to the feature extraction module 40. The feature extraction module 40 extracts low level content features from the block level data of the I-frame. The presently preferred embodiment extracts intensity data from each block. Other data may be alternatively extracted. Specifically, each block (e.g., block 28 of FIG. 1) contains a predetermined number of pixels (e.g., 32×32) and the mean of the intensity of each block is then extracted and used to define the feature data $M_F$ for the fragile watermark component. Specifically, the fragile watermark contains three hierarchical levels: I picture block level, I picture frame level, and group (GOP) level. GOP level contains encrypted group data and separate I, P, B frame data. We embed current I picture block level data, current I picture frame level data and previous GOP level data into current I frame. We need first to detect if the I frame which we embed the watermark in is correct. If it is correct, we can continue to detect previous GOP's watermark. Otherwise, we cannot decide if previous GOP is tampered. We use P. B frame information contained in GOP watermark to decide if P and B frame is tampered. The feature extraction module 40 also extracts feature data $M_R$ for the robust watermark component. In this case the feature data is extracted at the group (GOP) level from information contained in the I-frame.

Both values $M_F$ and $M_R$ are then fed to a hashing algorithm 42. The presently preferred embodiment uses the MD5 hashing algorithm, although other algorithms may be used instead. The MD5 hashing algorithm is a message-digest algorithm that implements four distinct rounds and generates from a message of arbitrary length a 128 bit message digest.

The results from the hashing algorithm (42 applied to the fragile watermark extracted feature data $M_F$) are then fed to an encryption module that employs private key encryption such as RSA encryption as at 44. The results of the hashing algorithm 42 (upon the robust watermark feature data $M_R$) are used directly as the robust watermark $W_R$, which is then supplied to the robust watermark embedding module 46. The results of encryption by module 44 generate the fragile watermark $W_F$ which are fed to the fragile watermark embedding module 48.

The robust watermark embedding module 46 and the fragile embedding module 48 operate at different levels. The fragile watermark is added on top of the robust watermark. Because the embedding capacity of these two watermarks is different, the fragile watermark can detect alteration at the block level while a robust watermark can detect alteration only at the group level. Both watermarks are embedded in the I-frame.

The fragile watermark comprises both control data and user data. The control data includes a time code which is then used to detect temporal jittering. The user data consists of three levels of information used to detect content modification. These three levels are: (1) block level data, (2) frame level data and (3) group level data.

Figure 3:
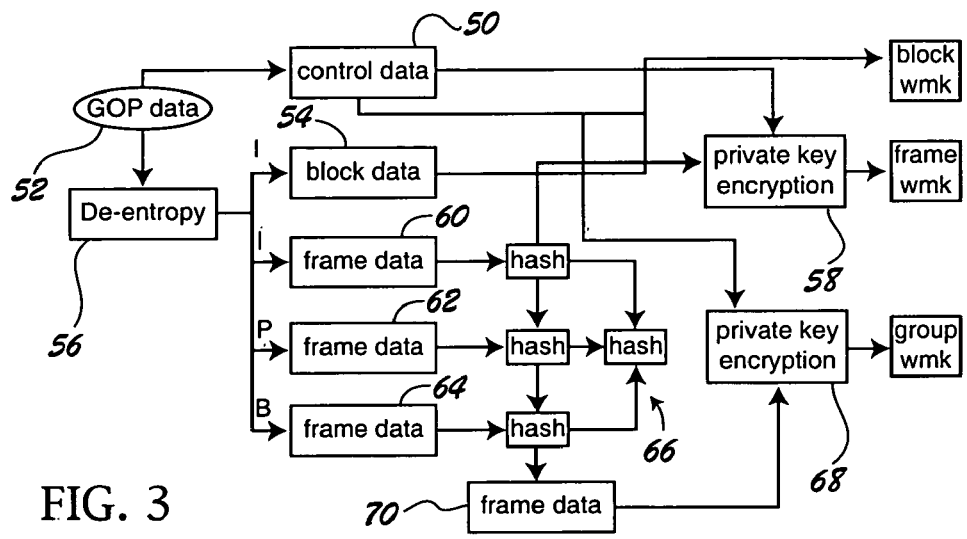
FIG. 3 is a block diagram illustrating how authentication data for the fragile watermark is generated in accordance with the invention.

The block level data is generated as discussed above by dividing the image into blocks of 32×32 pixels and using a low level content extraction process. As noted above, the presently preferred embodiment extracts the mean of the intensity of each block. Frame level data is comprised of the encrypted hash of the quantized Discrete Cosine Transform (DCT) coefficient where the least significant bit (LSB) of the AC coefficient equals 0. The group level user data comprises the encrypted hash of quantized DCT coefficient whose least significant bit of the AC coefficient equals 0 within the I-frame, together with motion vectors and quantized DCT residues of the associated P-frames and B-frames, plus each frame's independent hash information. FIG. 3 shows how the authentication data is generated for the fragile watermark.

FIG. 3 shows how the block watermark, frame watermark and group watermark components of the fragile watermark are generated in the presently preferred embodiment. Note that the block watermark is derived from the block data 54 that is extracted from the de-entropied data 56. The frame watermark component is extracted from frame data 60. Private key encryption is applied at 58. The private key encryption uses a hashed derivation of the frame data 60 and control data 50 to produce the encrypted value used as the frame watermark component.

The group watermark component is derived from frame data 60 from I-frame, frame data 62 from P-frame and frame data 64 extracted from the B-frame. Multiple hashing operations are performed as depicted at 66 and a private key encryption process is performed at 68. Note that the private key encryption process 68 uses frame data derived by sequentially hashing the I-frame, P-frame and B-frame data and frame data 70 which are combined data of I, P, and B hashing data which can be used to detect P, B frame tampering.

The fragile watermark is embedded by modifying the least significant bit of quantized DCT AC coefficient. An even number is output if "0" is to be embedded, otherwise an odd number is output. In addition, a Just-Noticeable-Difference (JND) is computed and any embedding which may result in a noticeable difference is withheld.

The robust watermark also contains control data and user data. Because the robust watermark has a lower embedding capacity, less information is typically stored in the robust watermark. The control data includes the group index which is used to detect temporal jittering. The user data comprises information extracted from the I-frame. The DC coefficients are used as the feature for WR.

As noted above, the preferred embodiment does not employ encryption on the hash value used for the robust watermark. Typically the hash value $W_R$ consist of only a few numbers, making private key encryption less effective. Therefore, instead of private key encryption, the I-frame block data may be shuffled using a secret key before hashing. This adds a level of security to the robust watermark. The robust watermark is embedded by a block-based spread spectrum technique. A noise-like random signal is generated and modulated with the authentication data. The watermark strength may then be adjusted using a Just-Noticeable-Difference (JND) calculation. In a preferred embodiment combined Time Division Multiple Access (TDMA) plus Code Division Multiple Access (CDMA) is employed.

Figure 4:
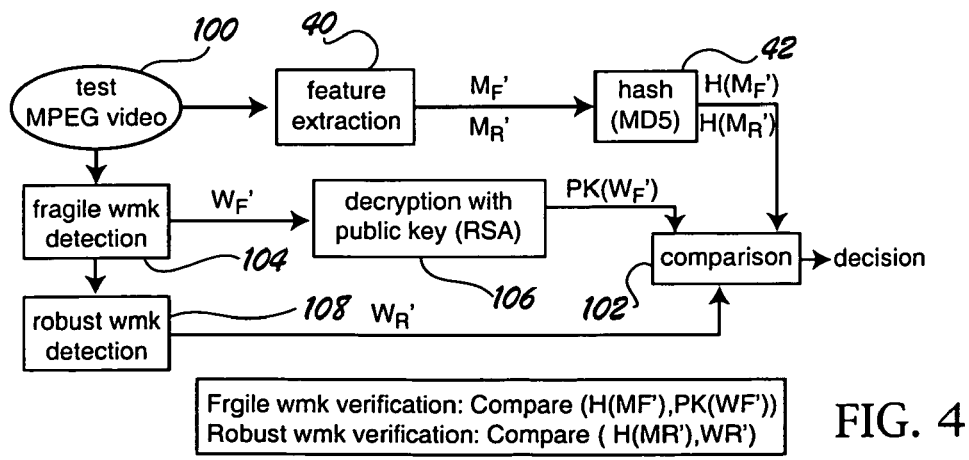
FIG. 4 is a block diagram illustrating the verification scheme used in conjunction with the semi-fragile watermark.

In use, the semi-fragile watermark is embedded in the digital data as described above. The presence of the watermark can then be tested for as illustrated in FIG. 4. Referring to FIG. 4, the digital data (e.g., test MPEG video data) is introduced at 100. The previously described feature extraction process is performed by feature extraction module 40 to generate the fragile and robust feature data $M_{F'}$ and $M_{R'}$. The hashing algorithm is then applied as at 42 and the hashed results are then fed to a comparison module 102. Meanwhile, the fragile watermark is detected in the input stream 40 by the fragile watermark detection module 104. The results of detection are then decrypted at 106 using the public key corresponding to the private key used by encryption module 44 (FIG. 2).

The watermark detection contains fragile watermark detection module and robust watermark detection module. The decrypted result of fragile watermark first goes to the comparison module 102. If it matches, the comparison module outputs a decision that data stream has been authenticated. If not, the decrypted result of robust watermark will go to the comparison module 102. If it matches, the comparison module outputs a decision that the video has been through transcoding. If not, the video has been tampered.

The semi-fragile watermarking system of the invention is capable of classifying attacks to the integrity of the data stream on several levels. The system can classify attacks to a MPEG video stream into three types:

1. Temporal jittering, which includes GOP additional, dropping and reordering, inter-group frame addition, dropping and reordering and intra-group frame addition, dropping and reordering;
2. Content modification, which divides into group level, frame level and block level modification; and
3. Counterfeiting attack.

The control data used in both the fragile and robust watermarks carries information needed to facilitate watermark extraction. In the preferred embodiment timing information is also added to detect jittering. User data is embedded in both fragile and robust watermarks to detect content modification. User data is comprised of content related features. To avoid counterfeiting attack, the invention introduces dependency into the authentication system by embedding current GOP information into the subsequent GOP.

While the invention has been described and is presently preferred embodiments, it will be understood that the invention is capable of modification without departing from the spirit of the invention as set forth in the appended claims.

What is claimed is:

1. A method of providing digital watermarking of a digital media containing predetermined digital content, comprising the steps of:

extracting at least one feature from said digital content;
constructing a first watermark component from said extracted feature;

constructing a second watermark component from said extracted feature;

embedding said first watermark component within said second watermark component to define a dual component watermark; and embedding said dual component watermark in said digital content, wherein an embedding capacity of a relatively more fragile component of said dual component watermark is sufficiently high to reveal alteration at a video block level, and an embedding capacity of a relatively more robust component of said dual component watermark is sufficiently low to ensure that the robust component can be accessed at a higher group level.

2. The method of claim 1 wherein said first watermark component is constructed by performing a hashing operation on said extracted feature.

3. The method of claim 1 wherein said second watermark component is constructed by performing a hashing operation on said extracted feature.

4. The method of claim 1 wherein said second watermark component is constructed by performing a hashing operation on said extracted feature and then encrypting the hashing operation result.

5. The method of claim 4 wherein said encrypting step is performed using the private key of a public key encryption process.

6. The method of claim 1 wherein digital content is digital video content and said feature extracting step is performed by obtaining an intensity value associated with at least one pixel of said digital video content.

7. The method of claim 1 wherein said digital content is digital video content organized as blocks containing a predetermined number of pixels and wherein said feature extracting step is performed by calculating the mean intensity value associated with a block of said digital video content.

8. The method of claim 1 wherein said digital content is MPEG video content organized as frames that include an intra-coded frame and wherein said feature extracting step is performed by extracting at least one feature from said intra-coded frame.

9. The method of claim 1 wherein said digital content is MPEG video content organized to include group-of-pictures information and wherein said feature extracting step is performed by extracting at least one feature from said group-of-pictures information.

10. The method of claim 1 said digital content is MPEG video content organized as frames that include an intra-coded frame and wherein said dual component watermark is embedded in said intra-coded frame.

11. The method of claim 1 wherein said first watermark component is embedded within said second watermark component using a block-based spread spectrum technique.

12. The method of claim 1 wherein said digital content is MPEG video content organized into groups and wherein said first watermark component contains group index information to detect temporal jittering.

13. The method of claim 1 wherein said second watermark component includes time code information to detect temporal jittering.

14. The method of claim 1 wherein said digital content is MPEG video content organized into frames, groups and blocks and wherein said first watermark component includes frame level, block level and group level information.

15. The method of claim 1 further comprising using said dual component watermark to classify attacks to said digital content according to multiple categories.

16. The method of claim 15 wherein one of said multiple categories is temporal jittering.

17. The method of claim 15 wherein one of said multiple categories is content modification.

18. The method of claim 15 wherein one of said multiple categories is counterfeiting attack.

* * * * *

UNITED STATES PATENT AND TRADEMARK OFFICE
CERTIFICATE OF CORRECTION

PATENT NO. : 6,996,717 B2  
DATED : February 7, 2006  
INVENTOR(S) : Peng Yin et al.

It is certified that error appears in the above-identified patent and that said Letters Patent is hereby corrected as shown below:

<u>Column 8,</u>
Line 9, insert -- wherein -- between "1" and "said".

Signed and Sealed this

Sixth Day of June, 2006

JON W. DUDAS  
*Director of the United States Patent and Trademark Office*